US006356282B2

(12) United States Patent
Roytman et al.

(10) Patent No.: US 6,356,282 B2
(45) Date of Patent: *Mar. 12, 2002

(54) ALARM MANAGER SYSTEM FOR DISTRIBUTED NETWORK MANAGEMENT SYSTEM

(75) Inventors: Michael Roytman, Glenview; Plamen Petrov, Barrington, both of IL (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,911

(22) Filed: Dec. 4, 1998

(51) Int. Cl.[7] ............................................. G06F 15/16
(52) U.S. Cl. ...................... 345/736; 345/784; 709/224
(58) Field of Search ................................. 709/223, 224; 706/45; 370/241; 714/712; 345/736, 784

(56) References Cited

U.S. PATENT DOCUMENTS

| | | | | |
|---|---|---|---|---|
| 5,388,189 A | * | 2/1995 | Kung ............................ | 706/45 |
| 5,473,596 A | * | 12/1995 | Garafola et al. ............ | 370/241 |
| 5,726,979 A | | 3/1998 | Henderson et al. | |
| 5,787,245 A | | 7/1998 | You et al. | |
| 5,828,840 A | | 10/1998 | Cowan et al. | |
| 5,923,885 A | | 7/1999 | Johnson et al. | |
| 5,926,631 A | | 7/1999 | McGarvey | |
| 5,954,829 A | * | 9/1999 | McLain, Jr. et al. ......... | 714/712 |
| 6,006,016 A | | 12/1999 | Faigon et al. | |
| 6,058,420 A | * | 5/2000 | Davies ........................ | 709/224 |
| 6,085,191 A | | 7/2000 | Fisher et al. | |
| 6,098,093 A | | 8/2000 | Bayeh et al. | |
| 6,131,118 A | | 10/2000 | Stupek, Jr. et al. | |

FOREIGN PATENT DOCUMENTS

| EP | 398987 B1 | * | 5/1997 |
|---|---|---|---|
| GB | 2254522 A | * | 10/1992 |

OTHER PUBLICATIONS

3com, HP Openview for Windows User Guide for Transcend Management Software, Oct. 1997, Hewlett–Packard Co., pp. 4.17–4.33.*
Cisco, Chapter 5: Using Threshold Manager, Cisco Systems Inc., Jan. 1997, pp. 5.1–5.18.*
3com, Transcend Enterprise Manager Alarm Management User Guide Version 4.2 for UNIX, 3com Corp., Mar. 1997, pp. 1.1–4.8.*
Sun Microsystems, Soltice Enterprise Manager 2.1: A Technical White Paper, Sun Microsystems, Inc., Jan. 1997, pp. 1–63.*

* cited by examiner

Primary Examiner—Patrice Winder
(74) Attorney, Agent, or Firm—Kudirka & Jobse, LLP

(57) ABSTRACT

The alarm manager display in a distributed network management system is arranged to have two modes of operation. In one mode of operation, the alarm manager display automatically scrolls when new events arrive. If there are sorting criteria defined, the alarm manager window scrolls either up or down depending on the sort order so that when new events arrive, they always appear on the screen. In the second mode of operation, the alarm manager window does not scroll when new events arrive. The scroll bar operational modes are selectable by an operator from a menu. In accordance with another embodiment, a special attribute is added to the alarm manager configuration file. This attribute is read when the alarm manager is started and places the alarm manager into the operational mode in which it was last used.

13 Claims, 9 Drawing Sheets

ALARM MANAGER SYSTEM FOR DISTRIBUTED NETWORK MANAGEMENT SYSTEM

FIELD OF THE INVENTION

This invention relates to network management tools for managing distributed networks and, in particular, to alarm management and alarm servicing tools.

BACKGROUND OF THE INVENTION

Present day telecommunications and information networks have become larger and far more complex than those which have been available only a few years ago. The trend towards increases in size and complexity can be expected to continue at a high rate into the foreseeable future with the proliferation of cellular networks, the development and deployment of global satellite networks, and the expansion of basic wireline networks in developing nations. Both homogeneous and heterogeneous networks are now being connected together by means of the Internet and other inter-network connection mechanisms.

In order to maintain network reliability and an acceptable quality of service, it is necessary to carefully monitor and manage network resources. However, as existing networks grow larger and more complex, network management also becomes more difficult and more complex. The prior art responded by providing automated management tools for reporting network status. These tools allowed network management personnel to improve the quality of service and maintain high network availability and reliability.

Such automated management tools were distributed and generally arranged as client server applications which provided integrated for supporting heterogeneous network environments. The client portion of the tools was arranged to have a standard interface which minimized variations of look and feel of the system as seen by the network operations personnel whereas the server portion was designed to operate on different platforms. The distributed architecture allowed the tool to evolve and scale as the networks evolved in size, capabilities, and geographies.

One such distributed network management tool is the Solstice Enterprise Manager™ (Solstice EM) network management system which was developed and is marketed by Sun Microsystems, Inc. This tool has an object-oriented and distributed architecture which consists of a plurality of cooperating components, including applications, libraries, information services, databases, and protocols, each of which performs specific tasks. The managed resources are arranged as a plurality of interconnected nodes and "management agents" running in each node gather information about the resources associated with the node. The information is then forwarded back to a management information server (MIS) which interacts with management applications running in other nodes. The MIS can request and change management parameter values, perform requested actions, and receive and evaluate problem reports (e.g. events, such as SNMP traps and CMIP notifications) that the management agents generate.

Although the MIS and the management agents can communicate with each other via various network management protocols such as Simple Network Management Protocol (SNMP), Common Management Information Protocol (CMIP), or other proprietary/legacy protocols, the Solstice EM™ framework interposes software model representations of managed resources in the MIS between management applications and agents of managed resources. The result is that the management applications need not be concerned with management protocol dependencies of the managed resources since the applications only interact with the software model representations in the MIS.

In particular, the management applications direct management tasks in the MIS via a "Portable Management Interface (PMI)" which is a high-level abstraction of an interface for manipulating objects, regardless of their class description, supported protocol, or location. The PMI is also used by the MIS to communicate with the management agents. For example, the MIS can use a management protocol adapter (MPA) to communicate with a management agent. An MPA translates MIS requests to protocol-specific primitives (e.g. CMIP, SNMP, RPC, or other proprietary/ legacy protocol primitives) depending upon the management agent in question. For example, a CMIP MPA communicates with CMIP agents.

One of the most important tasks that a network manager can perform is "alarm" monitoring and management. An alarm is an unsolicited notification called a "trap" in SNMP terminology and an "event" in CMIP terminology which is generated by an agent and sent to the MIS. The notification generally indicates that a particular managed resource associated with the agent has experienced a fault or failure condition or otherwise requires attention. Alarms have an associated severity level which can range from "critical" to "warning." Network management personnel can manage the alarms by changing their state. For example, a newly generated alarm has an "open" state. Network management personnel can "acknowledge" the alarm indicating that the alarm has been noted. After investigating the problem, the alarm can be "cleared", indicating the problem has been corrected.

Alarm Services is a module in the Solstice EM™ MIS responsible for updating and storing the state of managed objects in the MIS. Alarms arrive at the MIS as event notifications (via an MPA, for example). When such an event is received by the MIS, it is stored in an alarm log as an alarm log record by a Logging Services module and the Alarm Services module is informed about the arrival of this alarm. The Alarm Services module maps each managed-object-based alarm to a corresponding node in a topology database (discussed below) and updates the alarm counters for that topology node based on the alarm severity. The Alarm Services module also keeps the severity synchronized so that it represents the highest (most critical) uncleared alarm log record that is posted against the topology node. The node status is propagated to applications like the Solstice EM™ Viewer and displayed in the appropriate color. The alarm information is also sent to the Solstice EM™ Alarm Manager application for display.

The Alarm Manager program is intended to be used by network administrators and operators, to allow them to quickly see problems in the enterprise, and give them access to enough information so the problem can be fixed. The Alarm Manager does not display the alarm notifications directly. Instead it displays the alarm log records in the alarm log database in a tabular format. Therefore, the Alarm Manager has filters which can discard unwanted alarm information and can summarize, sort, and prioritize alarm information in order to display the information in a manner which is most information to the network management personnel. The Alarm manager also monitors the alarm log for events such as object creation, object deletion and object attribute values changes so that its display can be updated in an appropriate manner. Further, the Alarm manager can change the state of an alarm. For example, network personnel can use the Alarm Manager to change the state of an alarm from "open" to "acknowledged" or "cleared." This can be accomplished by selecting a particular alarm on a display screen and invoking an option to change the alarm state.

The Alarm Manager typically displays log records as rows in a record table. When the alarm log has many records, the large number of rows will not fit on the screen. Consequently, a scroll bar is provided to allow a user to scroll the records up and down on the screen so that a desired record can be brought into view. When new records are added to the display, the scroll bar typically flickers and resizes to alter the user that new records have arrived.

However, there are problems with this arrangement. In particular, the flickering and resizing of the scroll bar is not sufficiently noticeable to signal network management personnel that new events have arrived. Even if an operator is viewing the display when new events arrive, it is very easy to miss the resizing and thus miss very critical events.

In addition, if an operator actually wants to see all of the incoming events as they arrive, the operator must continually click on the scroll bar as events come in. In a busy system, it is impossible to click fast enough to see all events. Further, it is difficult to accurately move the scroll bar. An operator can click on the scroll bar arrow button to scroll the events, but the arrow only scrolls down the display one event at a time and thus is slow. It would be more advantageous to click on the slider between the scroll bar thumb and the arrow, but if the log is large enough, this area is so small that it is nearly impossible to keep clicking in it accurately.

Consequently, some versions of the Solstice EM™ system used an alarm manager in which incoming alarms caused the display to scroll automatically. However, in such systems there was no way of controlling the scrolling since it was inherent in the list control which displayed the alarm records Further, in such systems, scrolling always occurred in the "up" direction. However, depending on sort order, alarms could appear at either the top or bottom of the control. If alarms appeared at the bottom of the table a user would not be able to see them unless he manually scrolled the table down. In addition, in large systems, the constant movement of the display screen made it difficult to acknowledge individual alarms.

SUMMARY OF THE INVENTION

The aforementioned drawbacks are addressed in one illustrative embodiment of the invention in which the alarm manager display is arranged to have two modes of operation. In one mode of operation, the alarm manager display automatically scrolls when new events arrive. If there are sorting criteria defined, the alarm manager window scrolls either up or down depending on the sort order so that when new events arrive, they always appear on the screen. In the second mode of operation, the alarm manager window does not scroll when new events arrive.

In accordance with one embodiment of the invention, the scroll bar operational modes are selectable by an operator from a menu. In accordance with another embodiment, a special attribute name is added to the alarm manager configuration file. This attribute is read when the alarm manager is started and places the alarm manager into the operational mode in which it was last used.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
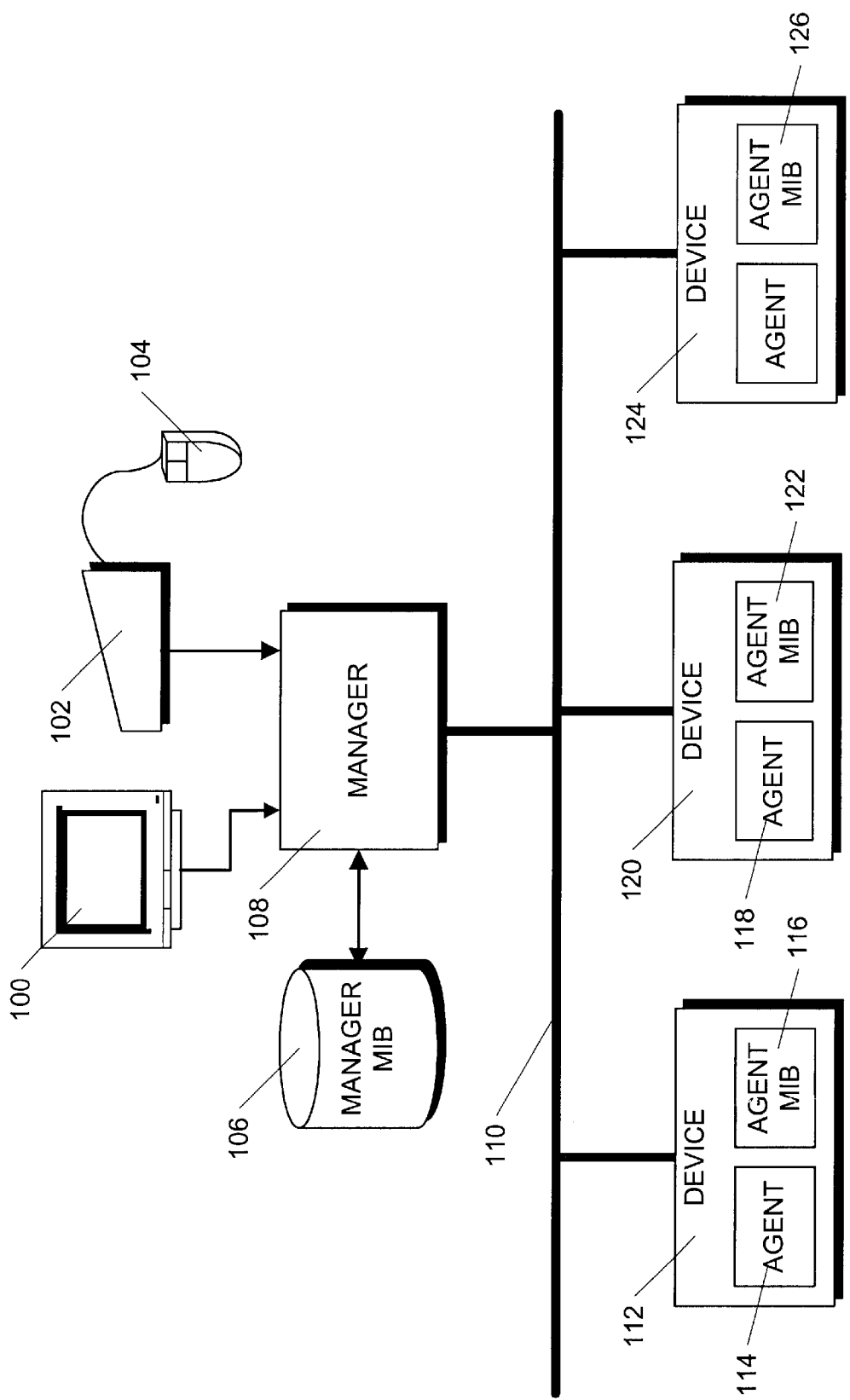
FIG. 1 is a block schematic diagram of a distributed network management system on which the present invention can be operated.

FIG. 1 is a block diagram of a distributed network management system on which an illustrative inventive network management system constructed according to the present invention can run. As shown, the system is a distributed computing environment comprising a plurality of individual computer nodes 108, 112, 120 and 124. The nodes are functionally organized into device nodes 112, 120 and 124 and at least one manager node 108 interconnected over a network 110. However, the device nodes 112, 120 and 124 and manager 108 can also be implemented on a single computer system. The manager node 108, is a conventionally programmed digital computer which includes user interfacing devices, such as a monitor 100, keyboard 102 and mouse 104. In the described embodiment, each node 108 is a network connectable computer, such as a Sun SparcStation™5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash. The manager node 108 also includes a database 106, such as a relational database, file system or other organized data storage system which stores management information in a management information database or MIB.

The Java programming language is rapidly emerging as the preferred object-oriented programming (OOP) language for cross platform use because Java programs consist of bytecodes, which are architecture and operating system independent and can be sent over the Internet and other networks. The bytecode is actually executed on a particular platform by means of a "virtual machine" (VM) which allows a Java program to be run on any platform, regardless of whether the Java program was developed on, or for, the particular platform which attempts to run the Java program. Java bytecodes which arrive at the executing machine are interpreted and executed by the embedded VM. A complete Java program is known as an application, while a segment of Java code, which does not amount to a full application, but is reusable, is referred to as an "applet".

Since Java is well-suited to operation on various platforms, the following description of the illustrative embodiment is directed toward the Java programming language. However, it will be obvious to those skilled in the art that the invention could be implemented for other OOP languages as well, e.g. C++.

Each device node, 112, 120 and 124, corresponds to a managed device which might for example, be a processor, printer, storage device, network adapter card or other network apparatus. The state of each managed device is monitored and controlled by an agent program running in the node. For example, agent programs 114, 118 and 128 run in nodes 112, 120 and 124, respectively. Each agent may also have a local management information database (116, 122 and 126, respectively) which stores status information and parameters for the managed device.

In operation, a management application program running in the manager node 108 cooperates with the agents 114, 118 and 128 to manage the network. The manager 108 can download information from the agents 114, 118 and 128 or from their associated databases 116, 122 and 126. The manager node 108 can also set parameters in the devices by instructing the agent programs to set parameters and values within the devices or their drivers.

Figure 2:
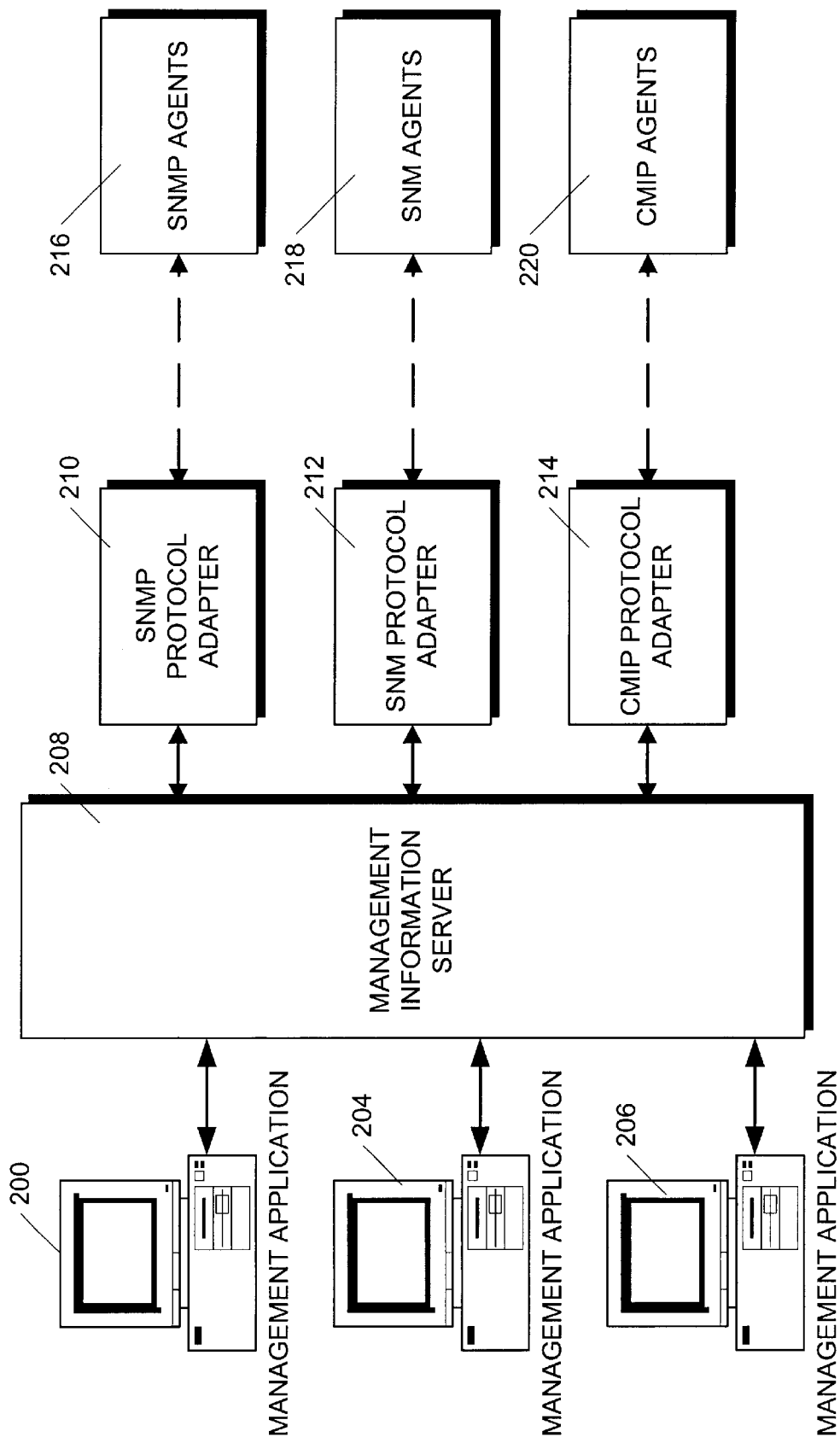
FIG. 2 is a block schematic diagram of a Solstice EM™ distributed network management system on which the present invention can be operated.

In the distributed network management system illustrated in FIG. 1, a single management node 108 is illustrated. This type of system is satisfactory for small networks. However, it does not scale easily because it is difficult to add additional management nodes as the network grows larger. FIG. 2 illustrates a distributed network management system which is designed to be scaleable by using a centralized management information server (MIS) 208. Management information server 208 can provide management information to a number of management applications operating in separate computers 200, 204 and 206, respectively. Alternatively, the management application may operate in one or more computer systems. A system based on this architecture is the Solstice Enterprise Manager™ network management system which is available from Sun Microsystems, Inc., 901 San Antonio Road, Palo Alto, Calif. The remainder of the application will be described in the context of the Solstice EM™ system. However, it will be obvious to those skilled in the art that similar network management systems could be used with the inventive management system without departing from the spirit and scope of the invention. In this system, the management applications are able to access management information located in the management information database that is now sited in the management information server 208.

The management information server 208 interacts with the agents associated with the managed objects 216, 218 and 220, respectively. These agents are typically located remotely in the device nodes and can communicate with the management information server 208 by means of a variety of protocols. In particular, management information server 208 can operate with separate protocols by means of management protocol adapters 210, 212 and 214. For example, management information server 208 can communicate with SNMP agents 216 by means of an SNMP protocol adapter 210. Similarly, management information server 208 can communicate with SunNet manager (SNM) agents 218 by means of an SNM protocol adapter 212. In a like manner, management information server 208 can communicate with CMIP agents 220 by means of a CMIP protocol adapter 214.

The configuration illustrated in FIG. 2 allows separate management applications, such as applications 200, 204 and 206, to share information and operate with a remote database located in the management information server 208. Management information server 208 can, in turn, communicate with a number of local or remote agents 216, 218, and 220 over various network facilities including the internet by means of several different protocols.

Figure 3:
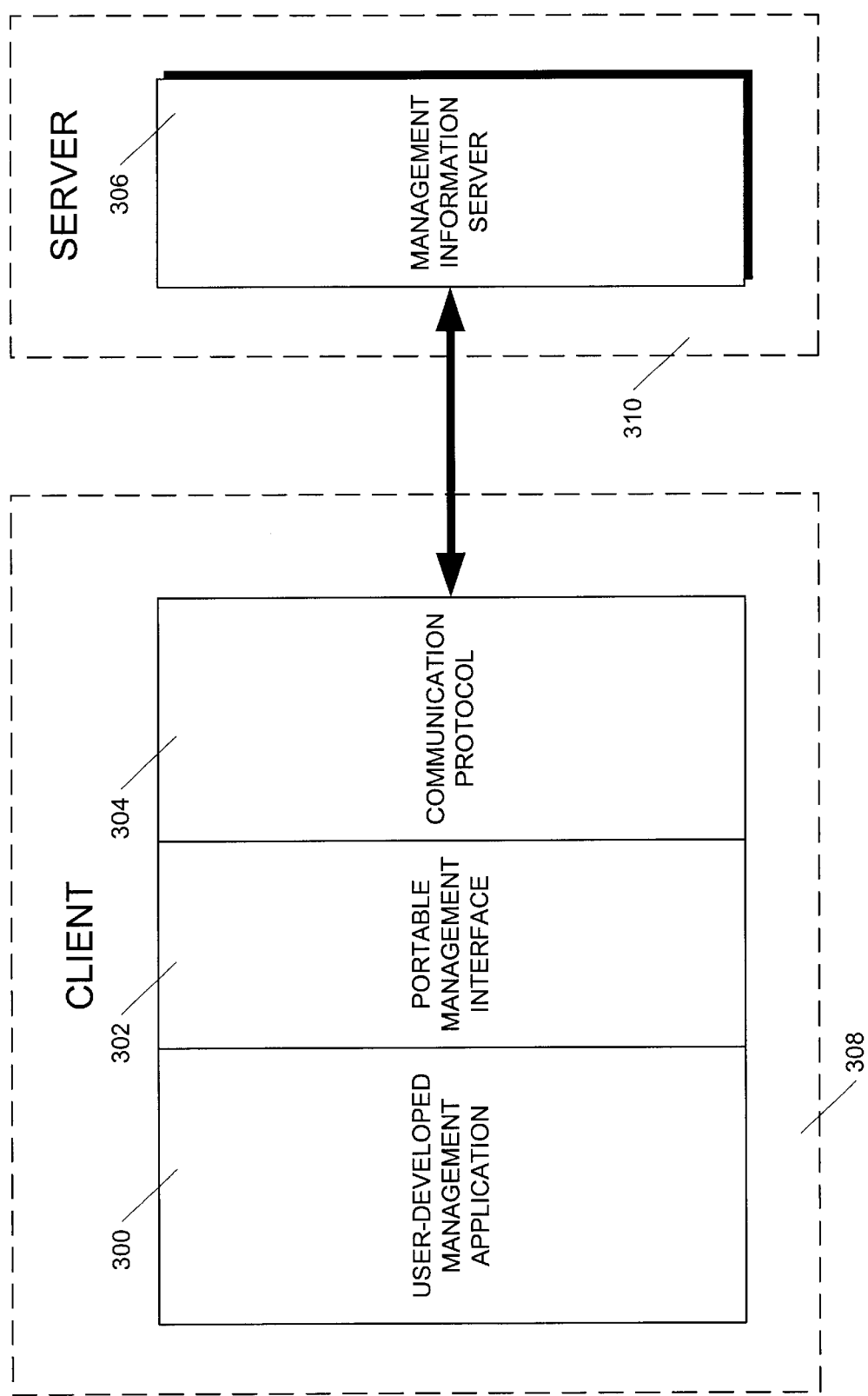
FIG. 3 is a block schematic diagram illustrating the communication between the user-developed management application and the MIS of the Solstice EM™ distributed network management system.

FIG. 3 illustrates, in a more detailed fashion, the manner in which user-developed management application 300 communicates with the MIS server 306. In particular, the user-developed management application 300 which is located in the client node 308 communicates with the management information server 306 located in the server node 310 by means of a portable management interface (PMI) 302. The portable management interface is an object-oriented interface which provides a consistent object-oriented access to the management information. It supports distributed applications that use various management protocols and address transparency. It utilizes a small number of C++ classes and allows for both asynchronous and synchronous applications, event registration for an application and various development services, such as runtime type checking.

The portable management interface 302 connects to the management information server 306 by means of a communication protocol indicated schematically as box 304. This protocol allows the portable management interface to access managed object instance state information stored or managed by the information server 306. It also allows access to managed object class schema stored by the management information server 306 and access to the event services provided by the management information server. The portable management interface 302 also allows managed object instance data to be cached in an application process and provides a simplified syntax for managed objects instance naming.

Events are handled in this system by a callback function registration procedure in which a user-developed management application which desires to obtain notification of an event which occurs in one of the devices, registers with the management information server 306 (by means of the portable management interface 302) an interest in the particular event. The application then acts as a "listener" for the event. When the event occurs, the management information server 306 calls all of the interested listeners. An object in the portable management interface 302 then handles the event call by forwarding it to the user-developed management application 300.

Figure 4:
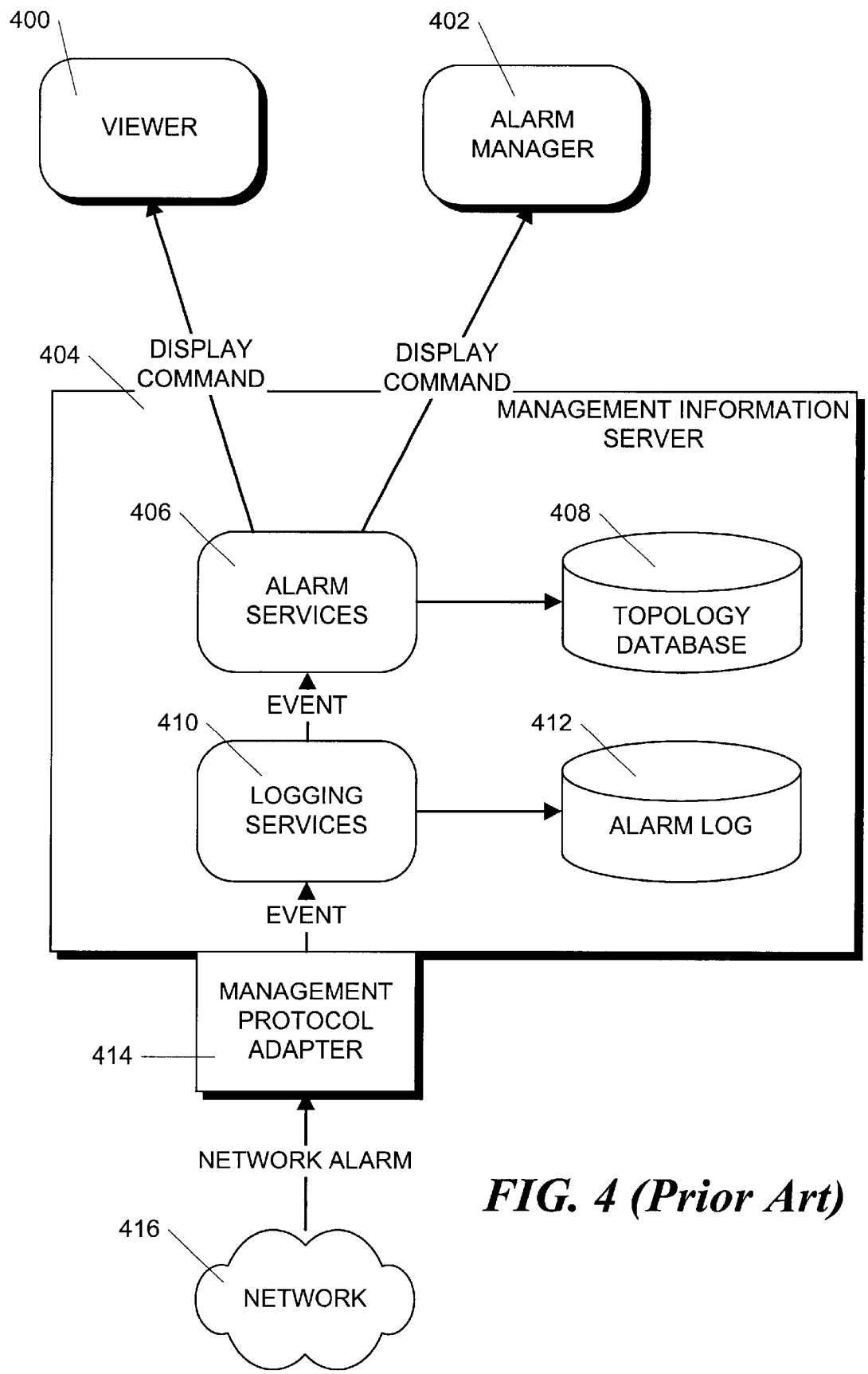
FIG. 4 is a block schematic diagram illustrating alarm services operation in the the Solstice EM™ distributed network management system.

FIG. 4 illustrates, in a schematic form, the processing of network alarms by a conventional Solstice EM™ network management system. In particular, agents connected to network 416 generate events or traps (generically referred to as "network alarms") in response to conditions which occur in the resources with which they are associated. The network alarms arrive at a management protocol adapter 414 which processes the alarms and generates events that are provided to a logging services module 410. The logging services module 410 updates an alarm log database 412 by adding a record containing the alarm information. In particular, the alarm log database 412 contains alarm log records as shown in FIG. 5.

Figure 5:
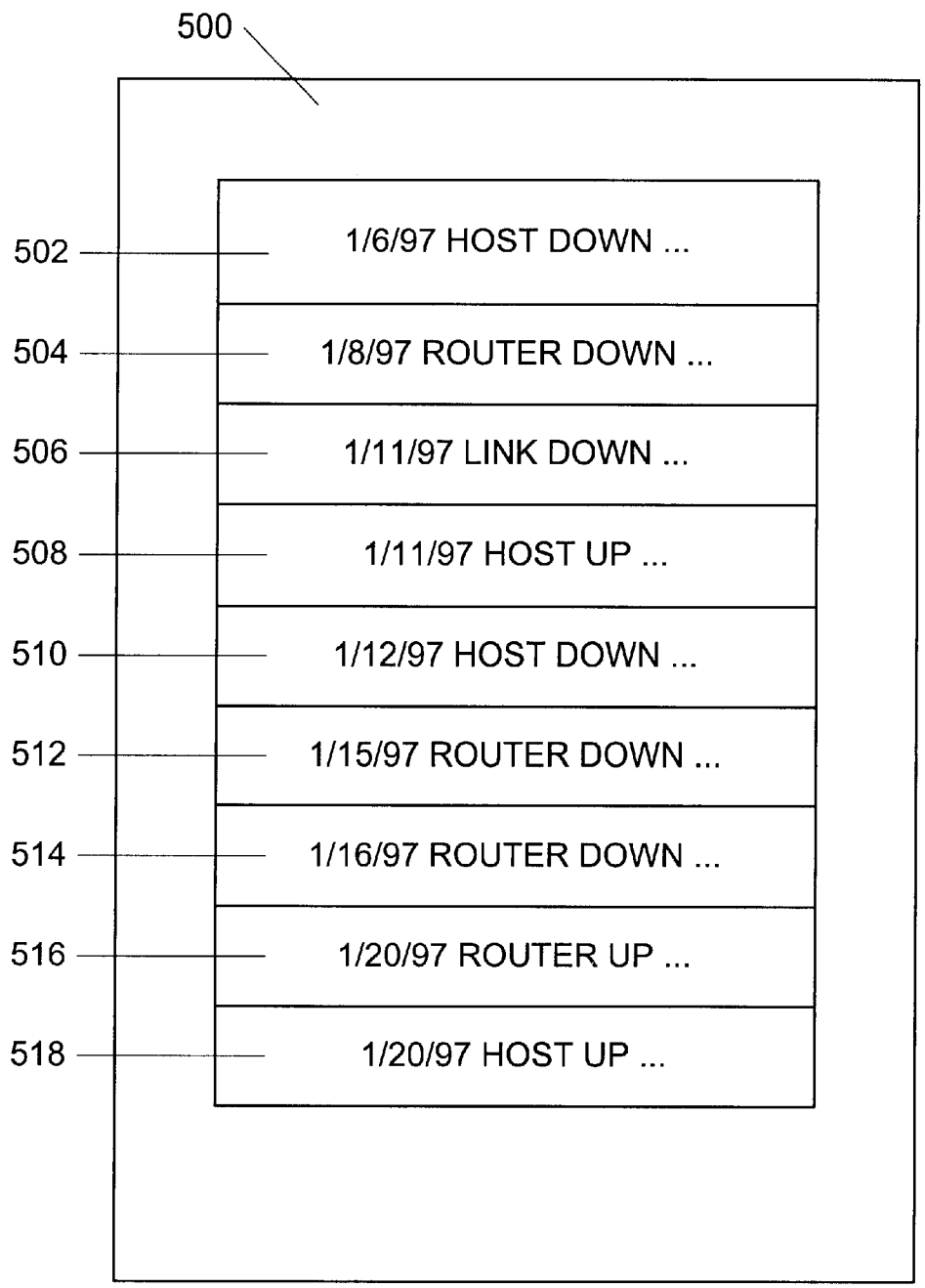
FIG. 5 is a block schematic illustration of the contents of a conventional alarm log database.

FIG. 5 illustrates a portion of alarm log database 500 which contains various alarm records, 502, 504, 506, 508, 510, 512, 514, 516 and 518. Generally, alarm records 502–518 include information concerning the date (and time) of an alarm and the alarm source and may additionally include other information helpful to network management personnel in identifying the cause of the alarm and its solution.

In addition, logging services module 410 forwards the events to an alarm services module 406. The alarm services module 406 is responsible for updating the state of a corresponding node in the topology database 408. The alarm services module 406 also generates display commands which are provided to a viewer 400 and an alarm manager 402. For example, alarm services module 406, in response to an incoming alarm event, can issue a display command to the viewer 400 causing the viewer to modify the display icon associated with the resource. In response thereto, the viewer 400 can change the color or shape of the icon. In addition, the alarm services module 406 can send another display command to the alarm manager 402 causing it to add another line on its display representing the newly-received alarm event.

In the conventional Solstice EM™ network management system, the viewer 400 and the alarm manager 402 are programs which would be located at the client terminal and manipulated by means of the portable management interface. The alarm manager displays a graphic representation of alarms and is intended to be used by network administrators and operators, to allow them to quickly see problems in the enterprise, and give them access to enough information so the problem can be fixed. The alarm manager does not display the alarms directly; instead it displays the records in the alarm log. Therefore, the alarms can be filtered and summarized before being displayed on the screen.

Figure 6:
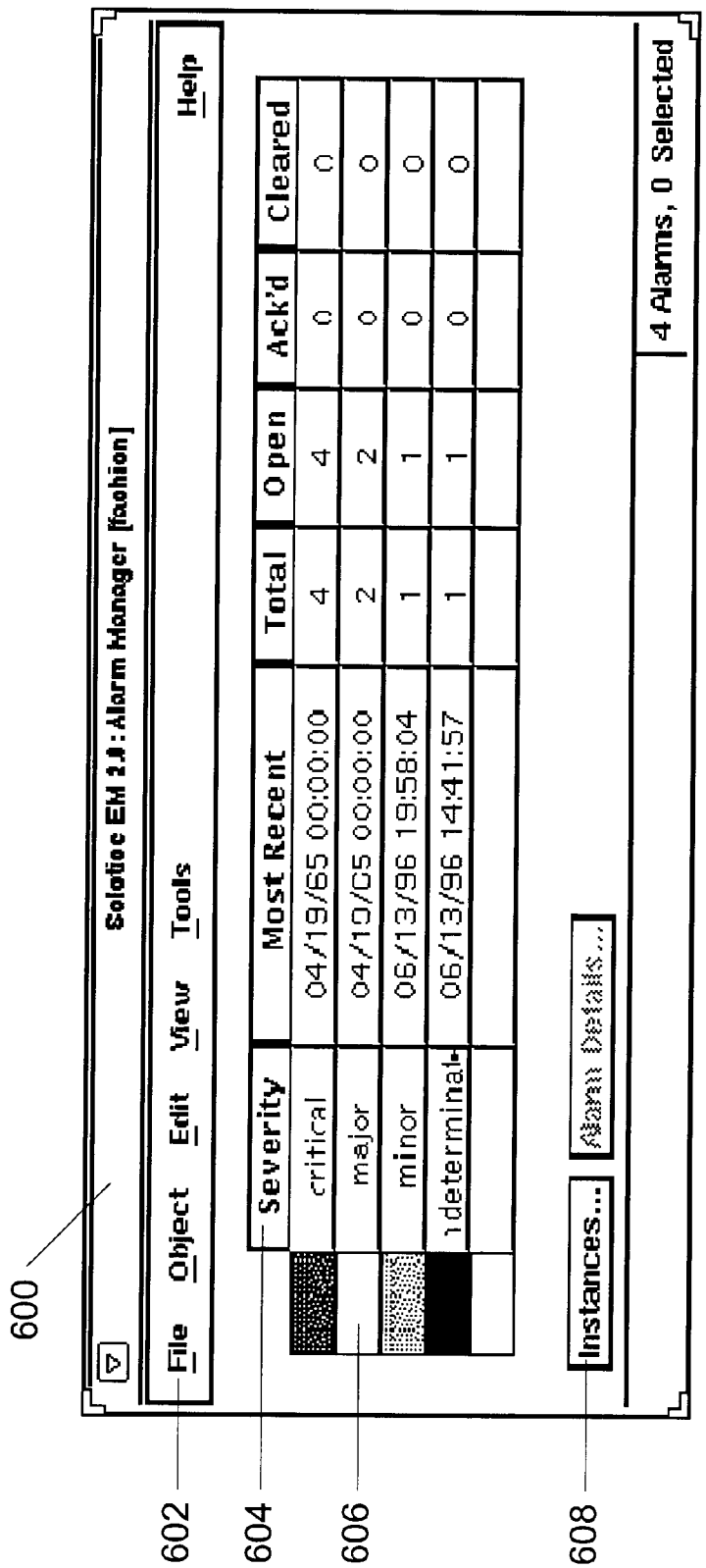
FIG. 6 is a screen display of the alarm manager illustrating an alarm summary display.

In particular, the graphic representation or view allows network personnel to View summary information about all alarms or the details of an individual alarm. The alarms manager display can also be used to change the state of an alarm as work progresses on resolving problems that trigger an alarm. Alarms of a certain type can also be grouped into an association so that actions can be taken on the group as a whole. As mentioned, the display can filter alarms to further refine the type of alarms an operator may wish to view. The display can further be used to delete alarms from the alarm log and graph alarm information When the alarm manager is initially started it displays a summary view of the alarms as indicated in FIG. 6. A summary view is a view of an alarm association. Alarm associations are groupings of alarms with equivalent values for one or more selected attributes, such as event type and object instance. Associations make it easier to manage large numbers of alarms generated for the same network problem, or problems in related areas.

This window display 600 is a conventional window 600 with a menu bar 602 that indicates several alarm attributes. One attribute is "perceived severity." The perceived severity is an attribute of each alarm, indicating the seriousness of the problem which caused the alarm. Each alarm is assigned one of a predetermined number of severity levels, such as "critical", "major", "warning", "minor", "normal" and "indeterminate" Severity is indicated in the alarm summary window 600 by the Severity column 604 and by the color shown in the first column 606 in the window 600 wherein different colors are used for each severity level. The view illustrated in FIG. 6 shows an alarm association by severity.

The display window 600 also shows the "state" of alarms. The state of an alarm helps network operators keep track of the status of network problems. Alarms may exist in three possible states: open, acknowledged and cleared. An open alarm has been received by the MIS and added to the alarm log, but not yet acted upon by an operator. An acknowledged alarm has been seen by an operator who has marked it to indicate that the alarm is being investigated. A cleared alarm indicates that the problem which caused the alarm has been fixed. In the display window 600, an alarm may be marked acknowledged or cleared, or both. An open alarm is neither acknowledged nor cleared.

In the association viewing mode, such as that illustrated in FIG. 6, an alarm listed in the table of alarms actually represents a group of similar alarms. The alarm selected to represent the group is either the highest severity, or the most recent. The operator can determine the criteria used to select the representative alarm when he specifies the association rules. Any action taken on an alarm while viewing associations applies to all the alarms in the group associated with that alarm. For example, if an alarm is acknowledged in the association viewing mode, all alarms in the same association are changed to an acknowledged state.

The alarms can also be filtered to select only those that match selected criteria. The criteria include managed object instance or the device triggering the alarm; managed object class or the type of device or resource generating alarms; alarm state or severity and event type, such as communications, Internet, etc. Further filtering can be performed on the date and time, acknowledgment operator or the user name of the operator who acknowledged an alarm, acknowledgment date, clear operator or the user name of the operator who cleared an alarm, clear date and problem code or the numeric or textual ID of the probable cause of an alarm.

Figure 7:
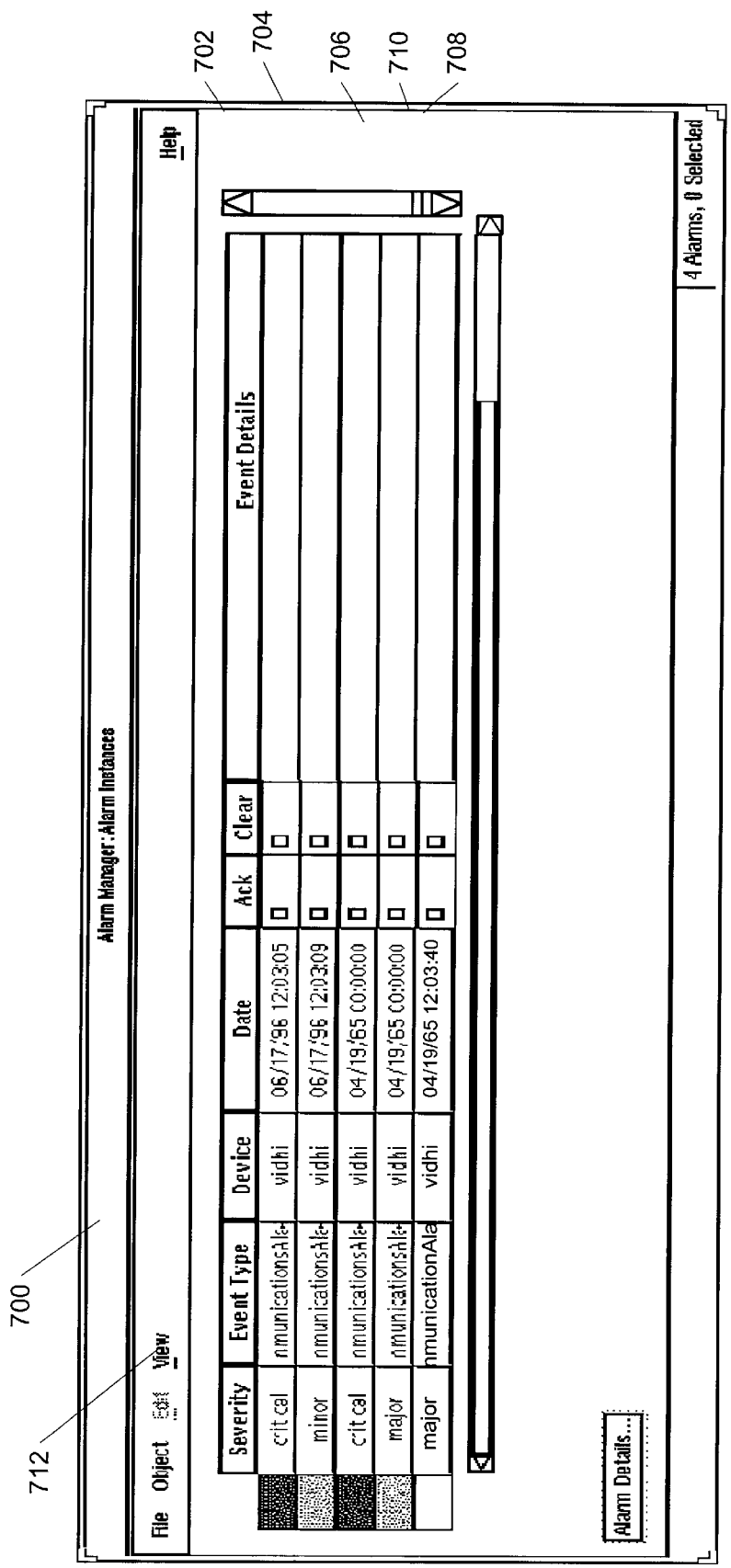
FIG. 7 is a screen display of the alarm manager illustrating display of individual alarms.

The display window 600 also allows an operator to change the view of alarms from the summary view shown in FIG. 6 to an alarm instance view shown in FIG. 7 by clicking on the "Instances" button 608. In the alarm instances view window 700, each individual alarm is represented by a line in the display. Additional information is also displayed for each alarm. This additional information includes the event type, acknowledgment operator, acknowledgment date, clear operator, clear date and event details. The alarms can also be sorted in either ascending or descending order on any of the attributes.

One problem with the alarm instances window illustrated in FIG. 7 is the scroll bar 704 which allows an operator to scroll particular lines representing individual alarms onto the display screen. When the alarm log has many records, the large number of rows will not fit on the screen display 700. Consequently, the scroll bar 704 is provided to allow a user to scroll the records up and down on the screen so that a desired record can be brought into view. When new records are added to the display, the scroll bar thumb 706 typically flickers and resizes to alter the user that new records have arrived.

However, the flickering and resizing of the scroll bar thumb 706 is not sufficiently noticeable to signal network management personnel that new events have arrived. Even if an operator is viewing the display when new events arrive, it is very easy to miss the resizing and thus miss very critical events. In addition, if an operator actually wants to see all of the incoming events as they arrive, the operator must continually click on the scroll bar 704 as events come in. In a busy system, it is impossible to click fast enough to see all events. Further, it is difficult to accurately move the scroll bar thumb 706. An operator can click on the scroll bar arrow buttons 702, 708 to scroll the events, but the arrows 702, 708 only scroll down the display one event at a time and thus are slow to use. It would be more advantageous to click on the slider 710 between the scroll bar thumb 706 and the arrow 708, but if the log is large enough, this area is so small that it is nearly impossible to keep clicking in it accurately. In addition, depending on a sort order, newly arrived alarms can arrive at the top or bottom of the alarm list. In accordance with the principles of the present invention, a scrolling function is inserted between the incoming alarm records and the tabular display, such as display view window 700. In addition a user interface is added to control the scrolling. The scrolling direction can be either "up" or "down", depending on the alarm sort order so user will always see the latest incoming alarm.

Figure 8:
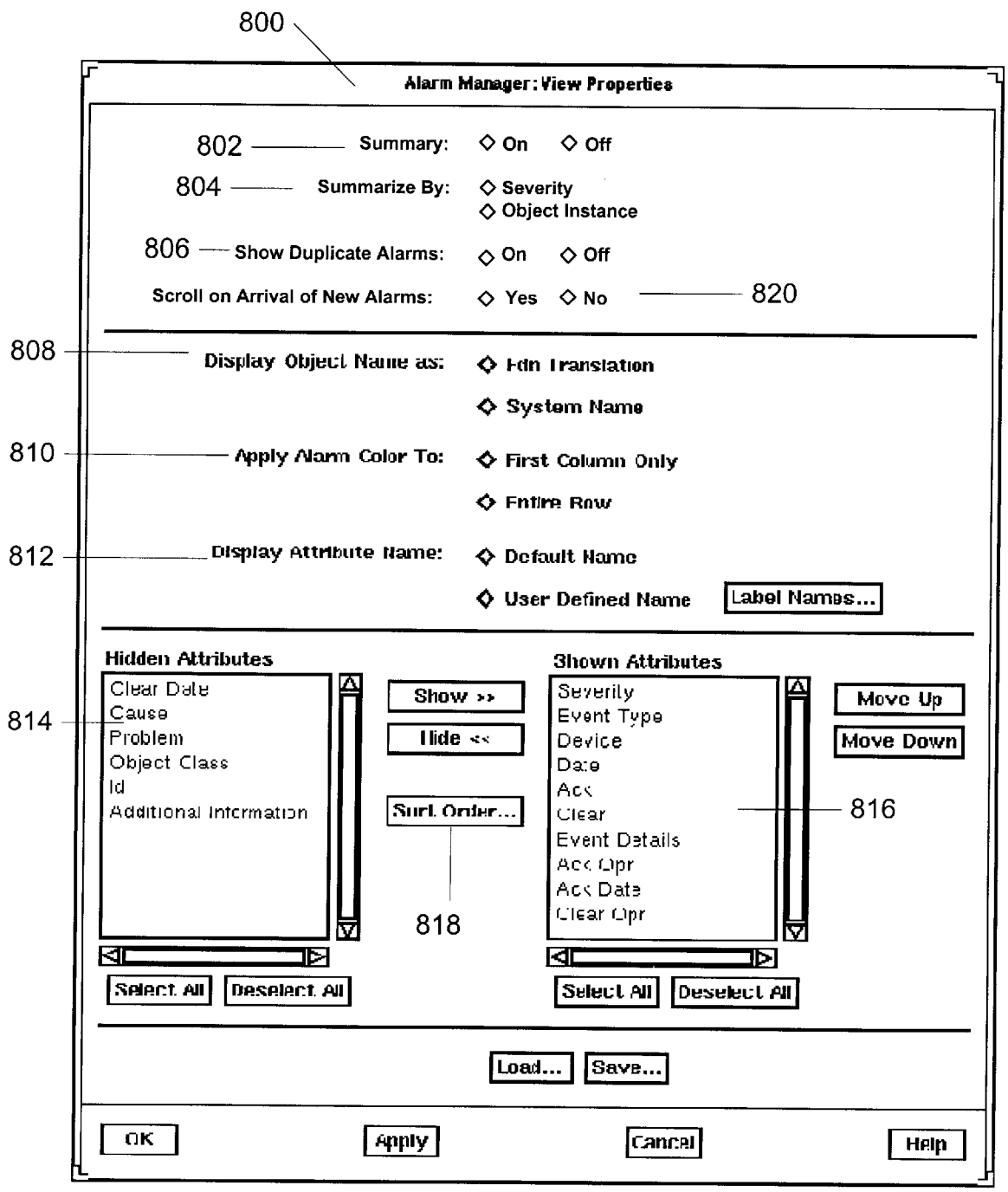
FIG. 8 is a screen display illustrating a view property dialog box with scrolling selections in accordance with the principles of the invention.

The user interface is illustrated in FIG. 8 which shows the "view properties" dialog of the inventive system. This dialog would be launched by selecting the "View" menu option 712 in FIG. 7 and then the "properties" selection from the menu popup. The view properties window 800 illustrated in FIG. 8 allows a user to control various aspects of the alarm display. For example, the Summary option button 802 can be used to control the summary display. If the "Off" option is selected a list of all alarm instances will be displayed. If the "On" option is selected associations will be displayed on the alarm manager display window 700.

The "Summarize By" field 804 determines the way groups of alarms are summarized in the alarm manager window when the Summary "On" option is selected. Groups of alarms can be listed in order of severity or by object instance by selecting the appropriate option.

The "Show Duplicate Alarms" field 806 controls display of duplicate alarms. When the "On" option is selected and the Summary option On is selected, and Alarm Association is Off, the summary line includes a count of duplicate alarms.

The "Display Object Name as" field 808 determines whether the system name or the Fully Distinguished Name (FDN) is displayed for the alarm device names.

The "Apply Alarm Color to" field 810 determines whether only the first column of an alarm row displays the alarm color or the entire row. The "Display Attribute Name" field 812 determines whether names labels in the table columns use the system default names or user-defined names.

The Hidden Attributes and Shown Attributes fields, 814 and 816, determine which alarm log attributes are displayed. Any attribute can be moved from one field list to the other by selecting the item and clicking on the Show or Hide buttons. The selected item moves from the original list to the other list.

The Sort Order button 818 opens a sort order window (not shown) which determines the order—according to selected attributes—in which alarms are sorted in the alarm associations and alarm instances windows.

In accordance with the principles of the invention, a new control labeled "Scroll on Arrival of New Alarms:" 820 is included. This control allows an operator to select whether the alarm instances window will automatically scroll when a new alarm record arrives or not. If the "yes" option is selected, the alarm instances window will scroll when a new alarm record is received. If the "No" option is selected, the alarm instances window will not scroll. In order to save the scrolling configuration a new attribute called "auto_scroll= off" can be added to the configuration files which control the startup configuration of the alarm manager view properties window. This attribute holds the operator's selection in control 820.

Figure 9:
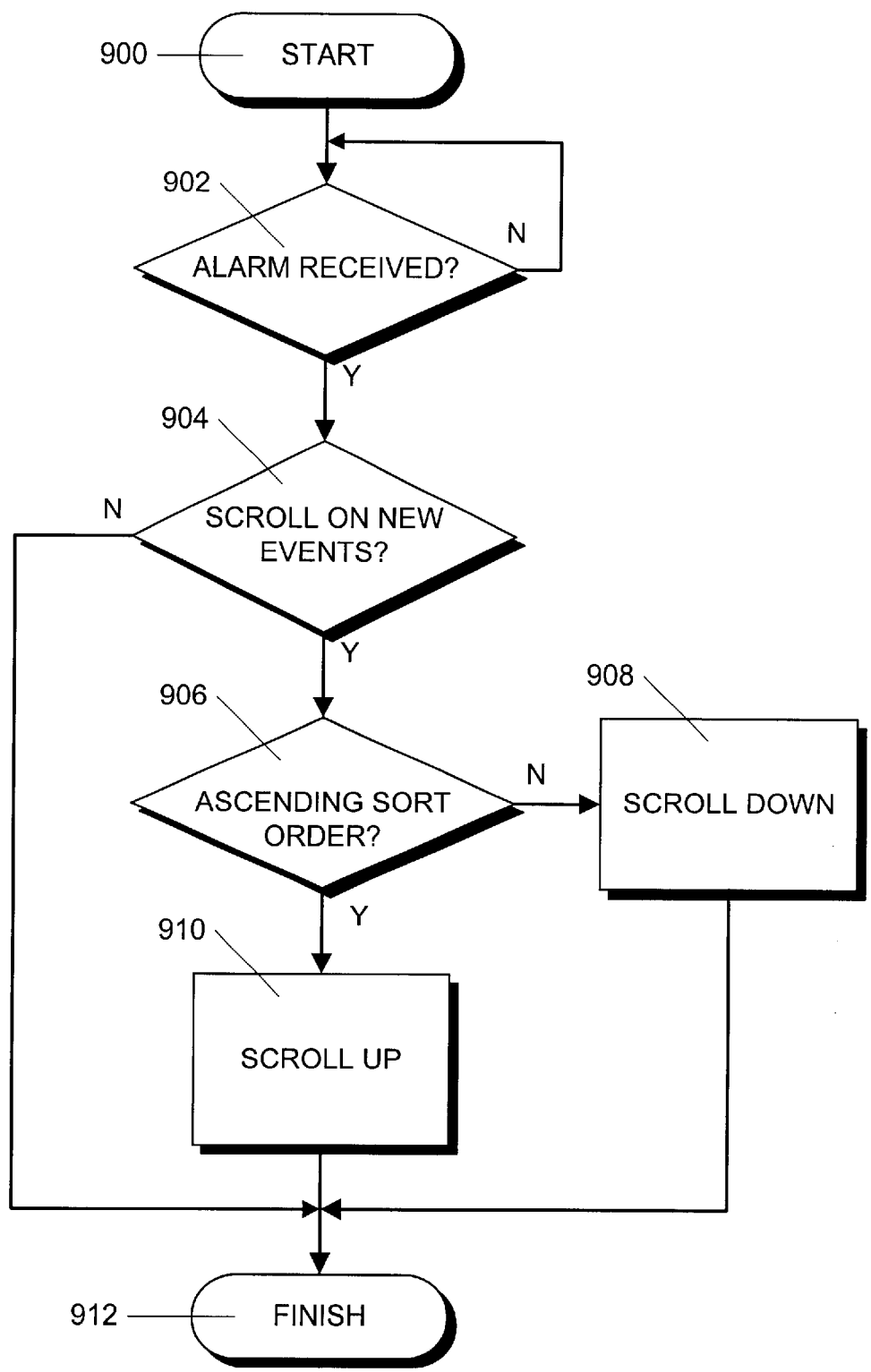
FIG. 9 is a flowchart illustrating the steps performed by a scrolling function.

The control 820 operates in conjunction with a scrolling function which controls the alarm instance display. FIG. 9 is a flowchart illustrating the steps in such a function. The process begins in step 900 and immediately proceeds to step 902 where the function waits for an alarm to be received. If no new alarm is received, the process proceeds back to step 902 to wait for an alarm.

When an alarm is received, the process proceeds to step 904 in which a determination is made whether the "No" option in control 820 has been selected. If so, the process finishes in step 912.

Alternatively, if, in step 904, the "Yes" option has been selected, the process proceeds to step 906 in which a determination is made whether the sort order is ascending or descending.

If the sort order is ascending the display is scrolled up one line in step 910. Alternatively, if the sort order is descending the display is scrolled down one line in step 908, In either case the process ends in step 912.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. Apparatus for use with a distributed network management system having alarm generation agents which generate alarms indicating the status of devices in a network, an alarm log for receiving and storing the alarms and an alarm manager which displays the contents of the alarm log in a scrollable list wherein only a predetermined number of items on the list are displayed, the apparatus comprising:

a user interface for receiving a command from a user of the alarm manager which command indicates whether the scrollable list should scroll in response to an alarm being received in the alarm log; and a scrolling function which is responsive to an alarm being received in the alarm log for adding the received alarm to the list and to the user command for controlling the scrollable list for switching between a first mode in which the list scrolls automatically in response to each received alarm so that the most recent alarm is always displayed and a second mode in which the list does not scroll automatically in response to each received alarm so that each received alarm can be manually scrolled into view and selected from the list, but a selected alarm remains displayed as alarms are received.

2. Apparatus according to claim 1 wherein the alarm manager comprises a mechanism for sorting the alarm records in an ascending sort order and in a descending sort order and wherein the scrolling function comprises a mechanism for scrolling the scrollable display in a first direction when the sort order is ascending and in a second direction when the sort order is descending.

3. Apparatus according to claim 1 wherein the user interface comprises a control in a dialog box.

4. Apparatus according to claim 3 wherein the dialog box is displayed in response to a menu option.

5. Apparatus according to claim 3 wherein the control is an option button.

6. Apparatus according to claim 5 further comprising a configuration file for determining the initial state of the option button.

7. A method for use with a distributed network management system having alarm generation agents which generate alarms indicating the status of devices in a network, an alarm log for receiving and storing the alarms and an alarm manager which displays the contents of the alarm log in a scrollable list wherein only a predetermined number of items on the list are displayed, the method comprising the steps of:

(a) receiving a command from a user of the alarm manager which command indicates whether the scrollable list should scroll in response to an alarm being received in the alarm log; and (b) controlling the scrollable list in response to an alarm being received in the alarm log to add the received alarm to the list and to the user command to switch between a first mode in which the list scrolls automatically in response to each received alarm so that the most recent alarm is always displayed and a second mode in which the list does not scroll automatically in response to each received alarm so that each received alarm can be manually scrolled into view and selected from the list, but a selected alarm remains displayed as alarms are received.

8. A method according to claim 7 wherein the alarm manager comprises a mechanism for sorting the alarm records in an ascending sort order and in a descending sort order and wherein step (b) comprises the step of:

(b1) scrolling the scrollable display in a first direction when the sort order is ascending; and (b2) scrolling the scrollable display in a second direction when the sort order is descending.

9. A method according to claim 7 wherein step (a) comprises the step of:

(a1) using a control in a dialog box to receive the user command.

10. A method according to claim 9 wherein step (a1) comprises the step of:

(a1a) displaying the dialog box in response to a menu option.

11. A method according to claim 9 wherein step (a1) comprises the step of:

(a1b) using an option button in a dialog box to receive the user command.

12. A method according to claim 11 wherein step (a) further comprises the step of:

(a2) using a configuration file for determining the initial state of the option button.

13. A computer program product for use with a distributed network management system having alarm generation agents which generate alarms indicating the status of devices in a network, an alarm log for receiving and storing the alarms and an alarm manager which displays the contents of the alarm log in a scrollable list wherein only a predetermined number of items on the list are displayed, the computer program product comprising a computer usable medium having computer readable program code thereon, including:

program code for receiving a command from a user of the alarm manager which command indicates whether the scrollable list should scroll in response to an alarm being received in the alarm log; and program code for controlling the scrollable list in response to an alarm being received in the alarm log to add the received alarm to the list and to the user command to switch between a first mode in which the list scrolls automatically in response to each received alarm so that the most recent alarm is always displayed and a second mode in which the list does not scroll automatically in response to each received alarm so that each received alarm can be manually scrolled into view and selected from the list, but a selected alarm remains displayed as alarms are received.

* * * * *